July 26, 1966    J. G. MARRIOTT ETAL    3,263,063
APPARATUS FOR PREVENTING THE FORMATION OF CONDENSATION
Filed July 1, 1963    3 Sheets-Sheet 1
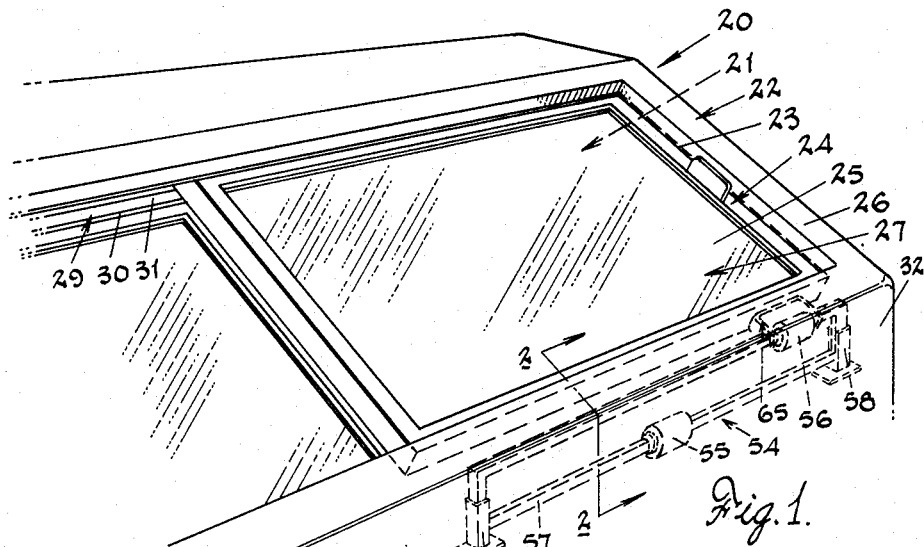
Fig. 1.
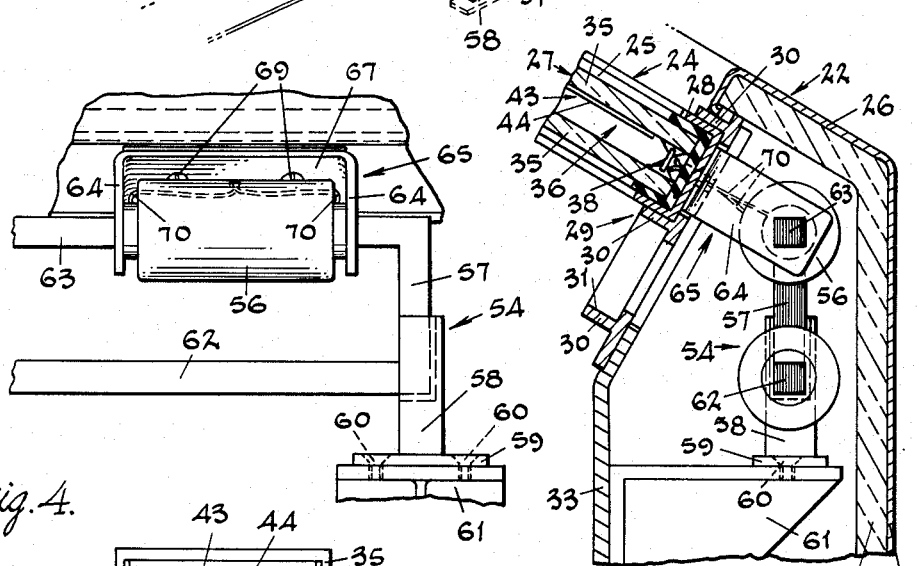
Fig. 2.
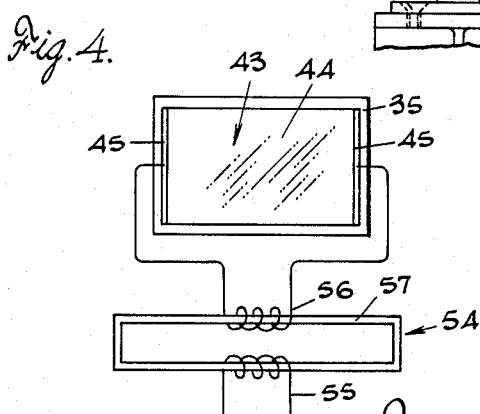
Fig. 4.
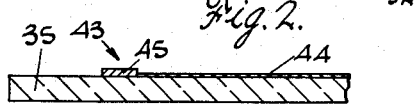
Fig. 3.
Fig. 5.
INVENTORS
James G. Marriott and
BY Charles F. Iffland
Nobbe & Swope
ATTORNEYS

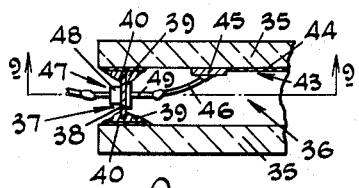
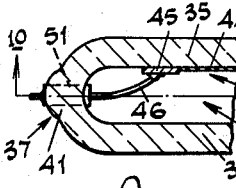
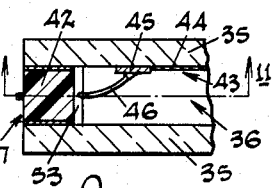
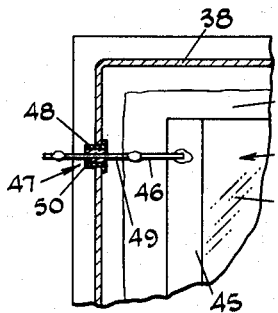
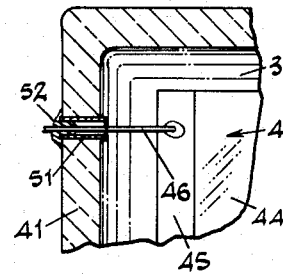
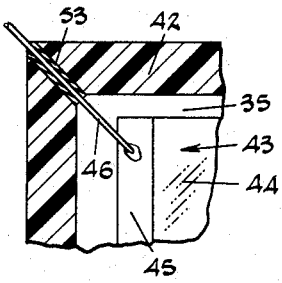
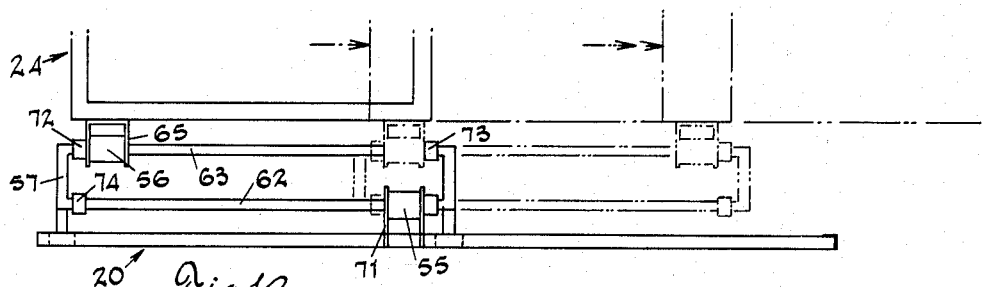
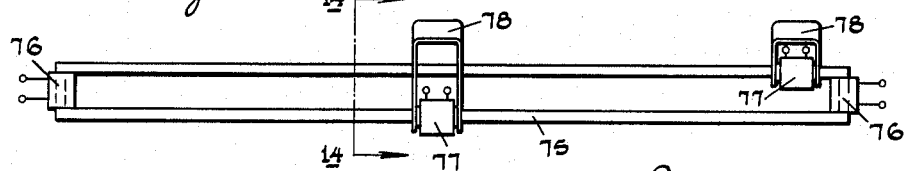
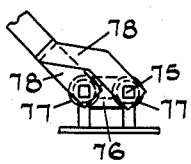

July 26, 1966 J. G. MARRIOTT ETAL 3,263,063
APPARATUS FOR PREVENTING THE FORMATION OF CONDENSATION
Filed July 1, 1963 3 Sheets-Sheet 3

INVENTORS
James G. Marriott and
BY Charles F. Iffland

Nobbe & Swope
ATTORNEYS

United States Patent Office 3,263,063
Patented July 26, 1966

3,263,063
APPARATUS FOR PREVENTING THE FORMATION OF CONDENSATION
James G. Marriott, Perrysburg, and Charles F. Iffland, Sylvania, Ohio, assignors to Libbey-Owens-Ford Glass Company, Toledo, Ohio, a corporation of Ohio
Filed July 1, 1963, Ser. No. 291,646
12 Claims. (Cl. 219—522)

The present invention relates generally to an electrical connection and more particularly to a device for conducting electrical energy between members which are movable relative to each other.

The primary object of the invention is to provide a connection of the above character which does not interfere in any way with relative movement between the members, which is completely electrically insulated, and which is not subject to fatigue or wear tending to break down the insulation during the service life of the connection.

Another object is to accomplish the foregoing by conducting the electrical energy between the members through the medium of a magnetic circuit.

Another object is to establish the electrical connection through the medium of coils slidably carried by a common core whereby the coils are linked by lines of magnetic flux passing through the core.

Other objects and advantages of the invention will become more apparent during the course of the following description when taken in connection with the accompanying drawings.

In the drawings, wherein like numerals are employed to designate like parts throughout the same:

FIG. 1 is a fragmentary perspective view of a refrigerated cabinet provided with an electrical connection device establishing a circuit between the cabinet and a door slidable therealong and embodying the novel features of the present invention;

FIG. 2 is a sectional view taken along lines 2—2 in FIG. 1;

FIG. 3 is a fragmentary sectional view of one of the glass sheets used in the refrigerated cabinet door and showing the electrically conductive film and bus bar adherent thereto;

FIG. 4 is a fragmentary view of the electrical connection of the present invention showing the closed loop core and one of the coils telescoped thereon;

FIG. 5 is a schematic view of an electrically conductive sheet connected to a source of electrical energy by the connection of the present invention;

FIGS. 6, 7 and 8 are similar sectional views showing portions of three different types of multiple sheet glazing units;

Figure 15:
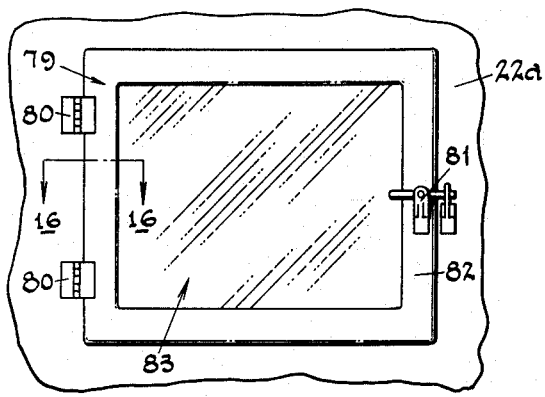
Figure 16:
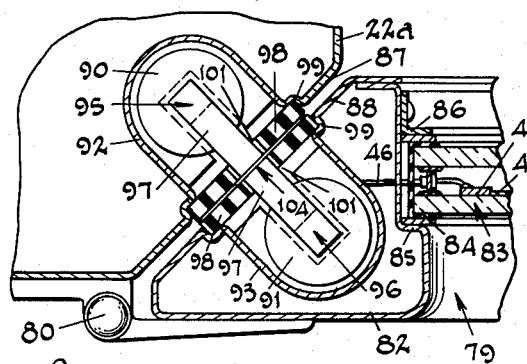
Figure 17:
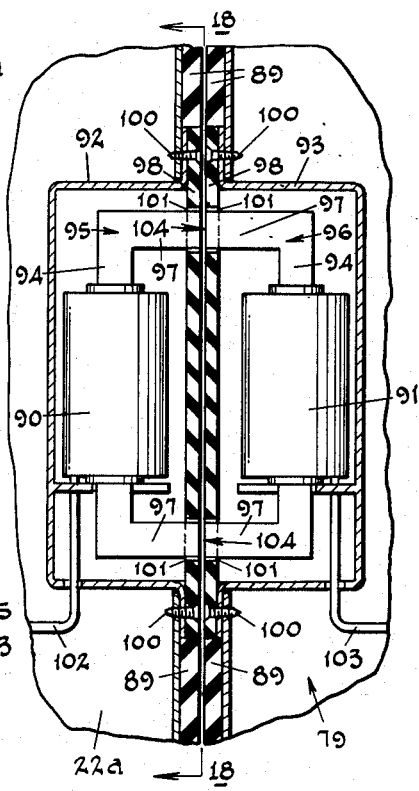
Figure 18:
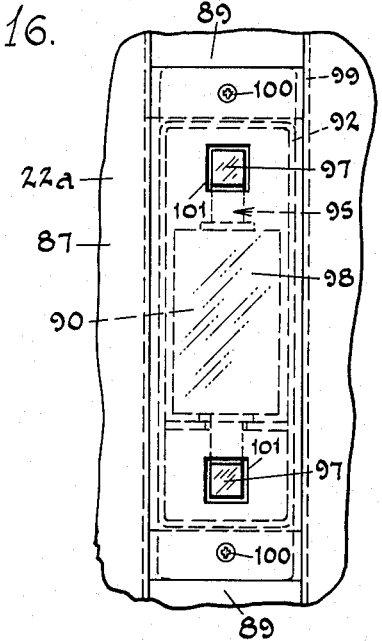

FIGS. 9, 10 and 11 are similar sectional views taken along lines 9—9 in FIG. 6, lines 10—10 in FIG. 7 and lines 11—11 in FIG. 8;

FIG. 12 is a fragmentary view of a modified embodiment of the present invention showing the relative positions of the individual elements at various points along the path of movement of the door in phantom;

FIG. 13 is a fragmentary view of another embodiment of the invention;

FIG. 14 is a fragmentary sectional view taken along line 14—14 in FIG. 13;

FIG. 15 is a fragmentary elevational view of a refrigerated cabinet having a hinged door swingable between opened and closed positions;

FIG. 16 is a sectional view taken along line 16—16 in FIG. 15 and showing a modified form of the electrical connection of the present invention;

FIG. 17 is an elevational sectional view of the modified form shown in FIG. 16; and FIG. 18 is a sectional view taken along line 18—18 in FIG. 17.

While the electrical connection device of the present invention may be advantageously employed in various applications to conduct electrical energy between members which are movable relative to each other, for purposes of illustration, the device is depicted herein in conjunction with a commercial type refrigerated cabinet 20 such as is commonly used to store and, at the same time, to display perishable goods. In general, display cabinets 20 of this type include a storage compartment 21 defined by insulated walls 22 and maintained at a relatively cool temperature by suitable refrigeration mechanism (not shown). Access to the compartment 21 is afforded through an opening 23 in the walls, which opening is provided with a door 24 movable relative to the cabinet between opened and closed positions. Glazed areas 25 are provided to permit the goods stored within the compartment to be viewed without opening the door and exposing the compartment to the ambient atmosphere.

Illustrated in FIG. 1 is one type of display cabinet in which the access opening 23 is provided in an inclined wall portion 26 and is closed by a glazed door 24. The door 24 consists of a glazing unit 27 mounted in a suitable frame 28 slidable back and forth along the cabinet in a track 29. The track 29 is formed by channel members 30 disposed on either side of the opening 23 to provide opposed, inwardly opening grooves 31 to receive the frame 28 of the door and guide its movement between the opened and closed positions. In order to permit easy access to both ends of the compartment, two similar sliding doors may be utilized, which doors are slidable in parallel tracks disposed one above the other along the opening (FIG. 2).

As is well known, the operational efficiency of refrigerated units of the above general character is dependent somewhat upon how well the refrigerated compartment is insulated from the relatively warm room atmosphere in which the cabinet is located. In other words, it is important that heat transfer between the refrigerated compartment and the surrounding atmosphere be held to a minimum. To this end, as shown in FIG. 2, the walls 22 of the cabinet are double and include spaced inner and outer panels 32 and 33 which may be covered by insulating material 34 and, if desired, the space between the panels may be packed with insulation. Since there is no material limitation regarding the type or amount of insulation which may be incorporated into the walls of the refrigerated cabinet, usually there is proportionally more heat transfer through the glazed areas or windows. To aid in retarding heat transfer through the windows, the latter may be glazed with multiple sheet or so-called insulating glazing units.

Generally, the type of glazing unit 27 used on refrigerated cabinets comprises spaced sheets of glass 35 sealed together around their marginal edges to form an air space 36 or chamber therebetween which may be filled with dehydrated air or gases or be exhausted to provide a partial vacuum. The sheets are spaced apart in face-to-face relationship by an interposed separator means 37 sealed to the marginal edges of the sheets to enclose the air chamber between the sheets. The dead air space between the glass sheets of the unit constitutes an insulating medium retarding the transfer of heat through the window. Various types of units of this general character are very well known in the art with the differences between the types residing mainly in the means separating and sealing the edges of the glass sheets.

While the present invention is not limited to the use of any particular construction of a refrigerated cabinet or to any particular type of multiple sheet glazing unit, solely for purpose of illustration, three of the better known types of units are shown in the drawings and hereinafter will be described in detail.

FIGS. 6 and 9 illustrate a so-called glass-metal type unit in which the glass sheets 35 are secured together in spaced relation by a relatively thin metallic separator strip 38 extending around the marginal edges of the unit and hermetically sealed to the glass sheets through the medium of solder fillets 39 joining the separator strip to metallic coatings 40 adherent to the marginal edge portions of the glass sheets.

Shown in FIGS. 7 and 10 is an all-glass unit in which the marginal edge portions of the glass sheets 35 are first heated to a temperature at which they become pliable and thereafter are urged toward and into fusion contact with one another to form a sealed edge wall 41 extending around the unit.

A third well-known type of unit, commonly referred to as a mastic-type unit, is illustrated in FIGS. 8 and 11. In this unit the sheets of glass 35 are maintained in spaced face-to-face relationship by a separator strip 42 interposed between the marginal edge portions of the sheets and cemented to such portions by an adhesive material to form an integral unit and to seal the air space between the glass sheets. The separator strip 42 may be formed from a variety of organic or inorganic materials with various types of plastic materials frequently being used.

Beyond increasing the efficiency with which the refrigeration unit operates, retarding the transfer of heat through the windows is important for still another reason. In this regard, it will be appreciated that when used on refrigerated cabinets, one side of a window, hereinafter referred to as the compartment side, is exposed to the cool atmosphere of the refrigerated compartment while the other side, hereinafter referred to as the room side, is exposed to the ambient atmosphere surrounding the unit which is usually relatively warm as compared to the interior of the cabinet. Due to the transfer of heat through the window the room side surface is maintained at a temperature which is below room temperature and if this surface is cooled to a temperature below the dewpoint temperature of the surrounding atmosphere, the moisture present in the room atmosphere condenses on the surface. This condensation is not only unsightly and messy but also, if it occurs in sufficient quantity, it may interfere with or completely obliterate vision through the window thus frustrating its intended purpose.

Under adverse situations when the dew point temperature of the atmosphere is comparatively high, the insulating qualities of multiple sheet glazing units are quite often not sufficient to prevent the room side sheet from being cooled to a temperature below the dew point. Moreover, even if the temperature of the room side surface of the sheet remains sufficiently high to prevent the condensation of moisture on this surface, it will be appreciated that when the door is opened and exposed to the room atmosphere, condensation quite readily forms on the inner surface or compartment side surface of the window since this surface is maintained at a relatively low temperature by being exposed to the refrigerated compartment. When the door is again closed, the condensate on the cabinet side surface is exposed to the frigid atmosphere of the refrigerated compartment and thus is not readily dissipated but rather tends to freeze producing a highly opaque frost.

To retard the condensation of moisture on the surface of the glass sheets and to rapidly dissipate this condensation should it form, heating means 43 may be positioned within the air space of the glazing unit to heat the glass sheets of the unit sufficiently to retard the condensation of moisture and to promote the evaporation of any condensation which might occur under the most adverse conditions.

It has been found that a very effective and efficient heating means 43 for the aforementioned purposes is a transparent electrical conductive film 44 placed on the inner surface of at least one of the sheets of the multiple sheet glazing unit. By using a film adherent directly to one surface of the glass sheet to be heated, the maximum amount of heat may be efficiently utilized with a minimum expenditure of energy. In addition, since this film 44 is placed on the inner surface of the sheet and is thus in an inaccessible location, it is mechanically protected from damage due to marring or scratching, which damage would impair the operation of the film. Moreover, in this way the glass sheets 35 act as an insulator to insure that the electricity will not be conducted outwardly of the unit.

It is not intended that the present invention be limited to a particular electrically conductive film, but rather that any film which meets the requirements outlined above as regards transparency and electrical conductivity may be utilized within the spirit of the invention. By way of example, very good results have been obtained with a tin oxide film of the type described in Patent No. 2,429,420, dated October 21, 1947. As described in the aforementioned patent, the film comprises tin chlorides, including hydrated stannous chloride and hydrated stannic chloride, applied by heating the glass sheets to a temperature in the neighborhood of the softening point of glass while immersed in one part glacial acetic acid, one part absolute alcohol and two parts stannic chloride by volume and heating until the boiling point is between 120° C. and 130° C. followed by removing the sheet and cooling it in open air. Films thus produced are found to be clear and of a uniform thickness. Moreover, they are very hard and tenacious and not harmed by washing.

To facilitate supplying electrical power to the film on the sheet, metallic electrodes 45 are fixed to the sheet in contact with the film 44. At least two such electrodes are utilized and these electrodes are secured to the sheet in spaced relationship so that the electrical current flows between the electrodes and through the film.

In order to insure that the completed unit, as an integral structure, is electrically insulated and to prevent the film 44 or the electrodes 45 from interfering with the fabrication of the glazing unit, the film is placed only on preselected areas of the sheet, which areas terminate inwardly of the outer edges of the glass sheets. As best shown in FIG. 3, the peripheral edges of the film 44 are spaced inwardly from the edges of the sheet 35 and the metallic electrodes 45 are also spaced inwardly of the edges of the sheet adjacent two opposed edges of the film. In this way the film 44 and electrodes 45 do not interfere with either the metallic strip 38, the fused edge wall 41 or the plastic separator strip 42. As shown in FIG. 6, in the glass-metal type of unit, the film 44 and the electrodes 45 are spaced inwardly of the metallic separator strip 38 to avoid electrical short circuiting.

The electrodes 45 are coupled to a source of electrical energy (not shown) through the medium of flexible conductors 46 such as wires threaded through the separator means 37 and fixed, as by soldering, to the electrodes. When the separator means 37 comprises the thin metallic strip 38 in a unit of the type illustrated in FIG. 6, an insulated grommet 47 surrounding the conductor 46 and separating the conductor from the strip 38 is utilized to prevent the conduction of electrical current to the strip. This grommet 47 includes a tubular metal housing 48 adapted to extend through the separator strip 38 and to be sealed thereto as by soldering or the like. A wire 49 passes through the opening in the tubular housing 48 and is separated therefrom by an insulating material 50 such as a body of glass disposed within the housing and surrounding the wire.

When an all-glass unit of the type illustrated in FIGS. 7 and 10 is utilized, the edge wall 41 of the unit itself acts as an insulator between the conductive film and the exterior of the unit. With this type of unit, in order to provide an opening in the edge wall 41 through which the conductor 46 may pass, an apertured metal grommet 51 is fused directly into the edge wall as the latter is formed. After the wire conductor 46 is threaded through the aperture in the grommet 51, the latter is sealed by a body of solder 52 which also securely holds the conductor in place.

With a mastic-type unit, the wire conductor 46 may be threaded through the plastic separator means 42 preferably at the mitered corners as illustrated in FIG. 11. A suitable mastic material 53 may be introduced around the wire 46 to seal the opening preventing leakage between the atmosphere and the air space and to hold the wire in place.

Due to their insulating qualities, multiple sheet glazing units of the above-described character are to be preferred over non-insulating types of glazing closures for use on refrigerated cabinets. It will be appreciated however, that by utilizing a heating unit associated with the closure, non-insulating glazing units may be used without encountering the objectionable condensation of moisture on the glass surfaces. By way of example, a condensation-free glazing closure may be formed from a laminated unit comprising two or more sheets of glass bonded together into an integral unit through the medium of suitable interposed bonding materials. By applying an electrically conductive film to one surface of at least one of the sheets and assembling the sheets with the filmed surface between the sheets, the film will be mechanically protected from physical damage and the unit as a whole will be electrically insulated.

When current flows through the film 44 between the oppositely disposed electrodes 45, the electrical energy is converted to heat energy which maintains the surfaces of the glass sheets at a temperature above the dewpoint temperature of the surrounding atmosphere. The current is carried to the electrodes 45 through the medium of the conductors or lead-in wires 46 by a connection 54 between the wires and the source of electrical energy. It will be appreciated that the connection between the electrodes 45 and the source of electrical energy should be completely insulated at all times to insure against short-circuiting and to prevent persons stocking or removing goods from the refrigerated compartment from coming into contact with hot or current bearing elements and being injured thereby. Further in this regard, the connection should resist wear and remain insulated throughout the service life of the cabinet regardless of the frequency with which the door is opened and closed.

Heretofore, connections of this general type have been made through the medium of a flexible conductor such as insulated wires or the like. It has been found, however, that over a period of time during which the door is repeatedly opened and closed, the insulation on the wires breaks down or becomes worn permitting short-circuiting, arcing and in some instances electrical explosions.

It is also desirable that the circuit carrying current to the film be maintained at all times and throughout the movement of the door relative to the cabinet. In this way, the surfaces of the glass sheets 35 will not be permitted to cool down and reach a temperature below the dewpoint temperature of the atmosphere. The connection should meet all of the requirements mentioned but, at the same time, must not interfere in any way with the free movement of the door relative to the cabinet.

The present invention contemplates a simple yet very efficient electrical connection between the film and a source of electrical current which meets all of the requirements enumerated above in that it maintains a positive and continuous circuit between the source and the film, remains electrically insulated throughout the service life of the unit and does not tend to break down due to wear resulting from repeated movements of the door relative to the source and does not interfere in any way with the movement of the door between the opened and closed positions.

In general, the connection 54 of this invention comprises two coils 55 and 56; one electrically coupled to a source of electrical energy and the other coupled to the film 44, which coils are disposed in and linked by a common magnetic circuit whereby energizing one coil with current from the source energizes the other coil by magnetic induction to provide a current passing through the film. The two coils 55 and 56 are mounted on the cabinet to move relative to the other as the door is opened and closed. For example, the primary coil 55, that is, the coil associated with the source of electrical energy, may be mounted in a fixed position on the cabinet 20 and the secondary coil 56 may be carried by the door 24 so as to move therewith back and forth relative to the fixed coil. For the connection 54 to function, the only prerequisite as regards the relative location of the two coils dictated by the present invention is that they be linked by the lines of magnetic flux generated by the primary coil. These lines of flux, of course, could pass through the air gap between the two coils whereby the circuit would be completed when the coils are in proximity with one another and broken upon the coils being moved apart.

In the embodiment best shown in FIG. 1, the two coils 55 and 56 are associated with a common core 57 which completes the magnetic circuit between the coils. Thus as shown schematically in FIG. 5, the coils 55 and 56 are telescoped on the core 57 and are slidable along the core to permit free movement of the door. When the primary coil is electrically connected to a source of electrical energy, lines of magnetic flux flow through the core and the flux passing through the secondary core induces a flow of current therein which current is conducted to the electrodes 45 and through the film 44 as illustrated.

Herein, the core 57 comprises an elongated loop of rectangular cross section which is made up of a plurality of laminated plates secured together to form an integral structure. The core 57 is disposed in a substantially vertical plane between the inner and outer panels 32 and 33 of the cabinet walls 22 adjacent the lowermost channel member 30, and is supported by upright mounting posts 58 adapted to receive the opposite ends of the core. The lower end of each of the posts 58 is attached to a plate 59 which, in turn, is secured as by screws 60, to a gusset-type mounting bracket 61 carried by the cabinet walls.

The primary coil 55 is disposed on the lowermost leg 62 of the loop and coupled to a source of electrical power which may be an ordinary 115 volt outlet. The secondary coil 56 is slidable along the upper leg 63 of the loop formed by the core 57 and is positioned between spaced legs 64 of a U-shaped bracket 65 which legs are notched or bored as at 66 to slip over the leg 63 of the core 57. The bight portion 67 of the bracket 65 projects through a slot 68 in the bottom of the groove 31 formed by the member 30 to abut the frame 28 of the glazing unit 27 and is secured thereto by screws 69 extending through the bracket and threaded into the frame 28. The ends of the wire 70 forming the coil 56 are attached by suitable means such as soldering to the conductors 46 extending through the separator means of the glazing unit and attached to the oppositely disposed electrodes 45. As the door 24 is moved between its opened and closed position the coil 56 secured to the bracket 65 remains in a fixed position relative to the door and slides back and forth along the upper leg 63 of the closed loop.

FIG. 12 illustrates a modified form of the present invention which permits a greater length of movement of the door along the cabinet. In this embodiment the primary coil 55 is carried by a bracket 71 secured to the cabinet and slidably receives the lower leg 62 of the closed loop core 57 permitting the core to be slid back and forth relative to the cabinet. As in the above described embodiment, the secondary coil 56 is carried by the U-shaped bracket 65 secured to the edge of the sliding door and is telescoped on and slidable relative to the upper leg 63 of the loop. When the door is in its fully opened or fully closed position, the coils 55 and 56 are disposed at opposite ends of the loop as shown in full line in FIG. 12. As the door 24 is moved in the direction of the arrows, the secondary coil 56 is engaged by a boss 72 fixed to the core 57 and is slid along the core toward the opposite end of the leg 63 whereupon it engages second boss 73 so that further movement of the door 24, as illustrated in broken line in the figure, slides the core relative to the primary coil 55 toward the opposite limit of the range of movement of the door. Upon reaching this limit, the primary coil 55 engages a boss 73 on the lower leg 62 of the loop. The similar sequence will, of course, occur when the door is moved in the opposite direction.

When the refrigerated cabinet is of the double sliding door type, that is, of a type having an elongated opening provided with two doors, each of which are slidable back and forth relative to the cabinet in parallel channels, both of the doors may be provided with a heating means in accordance with the present invention by utilizing the connection illustrated in FIGS. 13 and 14.

In this embodiment, an elongated closed rectangular loop core 75 is provided on the cabinet adjacent the opening. A primary coil 76 is mounted at each end of the core and a secondary coil 77 is slidably received on each of the legs of the coil. Through the medium of suitable U-shaped brackets 78, the secondary coils 77 are attached to the doors 24a in fixed positions relative thereto whereby sliding the doors between their opened and closed positions moves the secondary coils along the core.

While the novel electrical connection of the present invention has thus far been described primarily in connection with a cabinet utilizing a sliding type door or doors, it will be appreciated that the invention lends itself equally as well for use upon a cabinet having a hinge-type door. Illustrated in FIG. 15 is a cabinet of the latter type having a door 79 attached at one side to the cabinet by hinges 80 to swing about a fixed axis between an opened and closed position. A suitable latch mechanism 81 is provided adjacent the opposite side of the door to releasably secure the latter in the closed position.

As in the foregoing embodiment, the walls 22a of the cabinet are hollow and may be insulated with suitable material to retard heat transfer therethrough. The door 79 includes a substantially rectangular frame 82 of hollow wall construction defining an opening which is glazed, in the illustrated embodiment, with a multiple sheet glazing unit 83. The glazing unit 83 is seated, through the medium of a suitable gasket 84 against a shoulder 85 formed integrally with the frame 82 and is held in place by clips 86 bearing against the opposite side of the unit and clamping it against the shoulder. As in the above-described embodiment, a film type heating means 43 is provided in the glazing unit to discourage condensation of moisture on the surfaces of the unit.

The opening in the cabinet walls 22a is defined by a beveled wall portion 87 and the corresponding wall portions 88 of the door are similarly beveled so as to fit into the opening with the interfitting surfaces of the cabinet and frame closely adjacent each other. Leakage around the door between the refrigerated compartment and the surrounding atmosphere is prevented by sealing strips 89 of a resilient material such as rubber or the like secured to the wall portions 87 and 88, which strips abut each other when the door is in the closed position.

As in the embodiment described above, the electrical connection between the film and a source of electrical energy comprises primary and secondary coils 90 and 91 mounted on the cabinet and the door and linked by a common magnetic circuit. In the present instance, as best shown in FIG. 16, the coils 90 and 91 are mounted adjacent the hinge side of the door 79 and are recessed into the hollow wall portion 87 of the cabinet and the corresponding wall portion of the frame 82 of the door. For this purpose, each of these wall portions 87 and 88 are provided with openings adapted to receive casings 92 and 93, which casings project inwardly of the walls and into the hollow cabinet wall and door-frame and open outwardly to permit the coils to be inserted therein. The casings are secured to the wall portions 87 and 88 of the cabinet and door-frame through suitable fastening means 100 as shown in FIG. 17. The coils 90 and 91 are disposed in the casings 92 and 93 and are fixed to a bight portion 94 of generally U-shaped cores 95 and 96 of rectangular cross section. The legs 97 of each U-shaped core 95 and 96 extend outwardly toward wall portions 87 and 88 so as to be in close proximity when the door is in the closed position.

After the coils 90 and 91 and cores 95 and 96 are assembled in the casings 92 and 93, the openings in the latter are closed by sealing strips 98 of resilient material which are received in channels 99 formed in the casing and are held in place by the fastening means 100 securing the casings to the cabinet and the door-frame. Openings 101 are formed in the strips 98 through which the legs 97 of the cores 95 and 96 project.

Herein, the primary coil 90 is mounted in the wall of the cabinet and is coupled to a source of electric energy (not shown) by a wire 102 threaded through the casing and connected to the coil. The secondary coil 91 is carried by the door 79 and coupled to the electrically conductive film through the medium of a wire 103 threaded through the casing and joined to the conductor 46 attached to and leading outwardly from the electrode 45 of the heating means. Energizing the primary coil 90 establishes magnetic flux passing through the U-shaped cores 95 and 96 across relatively narrow air gaps 104 between the adjacent ends of the legs 97 of the cores. The secondary coil 91 is thus energized through magnetic induction and the energy induced therein is carried to the film. As the door is swung to the opened position, the adjacent ends of the U-shaped cores are moved apart, thus breaking the magnetic circuit linking the two coils and thereby interrupting the flow of current to the heating film.

An electrical connection constructed in accordance with the present invention not only permits free movement of the members connected thereby while remaining electrically insulated throughout its service life, but, in addition, is readily adaptable for use with a variety of electrically heated glazing units exhibiting different power characteristics. In this regard, it will be apparent that the power input of the film depends on a number of factors such as the distance between the electrodes, the surface resistivity of the film and the voltage input to the film. Changing any of these factors results in a change in the amount of heat given off by the film. Now, with a given voltage input and film, increasing the size of the glazing unit, which would change the distance between the electrodes, decreases the power input to the film and thus the amount of heat given off by the film. However, by varying the film and/or the voltage input, a power input within an optimum range may be maintained. Furthermore, either of these factors, the film or the voltage input, may be held constant permitting the use of either a standard film having a given resistivity or a standard secondary coil whereby the voltage input remains constant.

It is to be understood that the forms of the invention herewith shown and described are to be taken as illustrative embodiments only of the same, and that various changes in the shape, size and arrangement of parts may be resorted to without departing from the spirit of the invention.

We claim:

1. In an electrical connection for conducting electrical energy from a source to a member movable relative to the source, a first coil, means electrically connecting said first coil to a source of electrical energy thereby to energize the coil and produce a magnetic circuit surrounding the coil, a second coil attached to said movable member for movement therewith and located within said magnetic circuit, and means electrically connecting said second coil to said movable member.

2. In an electrical connection for conducting electrical energy from a source to a member movable relative to the source, a core, a first coil telescoped on said core, a second coil telescoped on and slidable along said core, means connecting said first coil to a source of electrical energy thereby to produce a magnetic circuit through said core, and means connecting said second coil to said member whereby said second coil slides along said core in response to movement of said member.

3. In an electrical connection for conducting electrical energy from a source to a member movable relative to the source, an elongated closed loop core having spaced parallel legs, a first coil telescoped on one leg of said core, means connecting said first coil to said source to energize said first coil and thereby produce a magnetic circuit in said core, a second coil telescoped on another leg of said core and attached to said movable member, said first and second coils and said core being adapted to slide relative to each other in response to movement of said member relative to said source, and means connecting said second coil to said movable member.

4. In combination with a door mounted on a frame for movement relative thereto between open and closed positions and having an electrical condensation preventing means associated therewith, an electrical connection between said condensation preventing means and a source of electrical energy on said frame, comprising a first coil mounted on said frame adjacent said door, means connecting said first coil to said source whereby a magnetic field is generated by and surrounds said first coil, a second coil mounted on said door for movement therewith into and out of said magnetic field generated by said first coil, and means connecting said second coil to said condensation preventing means.

5. A door mounted on a cabinet for movement relative thereto between opened and closed positions and having electrical condensation preventing means carried thereby, means connecting said condensation preventing means to a source of electrical energy mounted on said cabinet comprising a first coil fixed to said cabinet adjacent said door, means connecting said first coil to said source to energize said coil and establish a magnetic circuit passing therethrough, a second coil carried by said door for movement relative to said first coil in response to movement of said door, said second coil being disposed in said magnetic circuit thereby to induce a flow of energy through said second coil, and means connecting said second coil to said condensation preventing means.

6. In combination with a door slidable on a cabinet along a definite path between opened and closed positions and having an electrical heating means carried thereby, means connecting said heating means to a source of electrical energy mounted on said cabinet comprising an elongated core extending along said definite path, the first coil mounted on said cabinet and telescoped on said core, a second coil telescoped on said core, means attaching said second coil to said door, said core and said first and second coils being slidable relative to each other during movement of said door between said opened and closed positions, means connecting said first coil to said source of electrical energy to energize said coil and thereby produce a magnetic circuit passing through said core, and means for connecting said second coil to said heating means.

7. For use with a refrigerated cabinet having an access opening selectively opened and closed by a door slidable along said cabinet, said door having glazed areas and electrical heating means associated therewith to prevent the formation of condensation and frost thereon, means connecting said heating means to a source of electrical energy on said cabinet comprising an elongated core mounted on said cabinet in proximity to said opening, a first coil carried by said cabinet and disposed on said core, a second coil carried by said door and disposed on said core, means connecting said first coil to said source of electrical energy thereby to energize said coil and produce a magnetic circuit passing through said core inducing a flow of energy through said second coil, and means connecting said second coil to said heating means.

8. For use with a refrigerated cabinet having an elongated access opening selectively opened and closed by doors slidable along said cabinet and electrical heating means carried by said door, an elongated core mounted on said cabinet adjacent said opening and extending along the path of movement of said doors, first coils encircling said core, second coils telescoped on and slidable along said core, bracket means attaching each of said second coils to one of said doors whereby movement of said doors between said opened and closed positions slides said coils back and forth along said core, means connecting said first coils to a source of electrical energy thereby to produce a magnetic circuit flowing through said core, and means connecting said second coils to said heating means on said doors.

9. For use with a door pivoted on a cabinet to swing about a predetermined axis between opened and closed positions and having electrical heating means carried thereby, an electrical connection between said heating means and a source of electrical energy on said cabinet comprising a first coil mounted on said cabinet adjacent said predetermined axis, means connecting said first coil to said source of electrical energy to energize said coil and produce a magnetic field, a second coil carried by said door to swing therewith about said predetermined axis toward and away from said first coil and into and out of said magnetic field, and means connecting said second coil to said heating means.

10. In combination with a door pivoted on a cabinet to swing relative thereto about a predetermined axis between opened and closed positions and having electrical heating means carried thereby, an electrical connection between said heating means and a source of electrical energy on said cabinet comprising a first generally U-shaped core having a bight portion and laterally extending leg portions mounted on said cabinet adjacent said predetermined axis with said leg portions projecting toward said door when the latter is in the closed position, a first coil telescoped on said bight portion of said core, a second generally U-shaped core having a bight portion and laterally extending leg portions mounted on said door adjacent said predetermined axis to swing therewith about said axis toward and away from said first core, with said legs of said second core extending toward said cabinet in alignment with and spaced from said legs of said first core when said door is in the closed position, a second coil telescoped on said bight portion of said second core, means connecting said first coil to said source to energize said first coil thereby to produce a magnetic circuit passing through said first and second cores and between the spaced ends of said legs on said first and second core, and means connecting said second coil to said heating means.

11. Apparatus for preventing the formation of condensate and frost on windows in movable glazed doors of a refrigerated cabinet having, in combination, an electrically conductive film adherent to said windows, a coil mounted on said door for movement therewith and connected to said film, a second coil mounted on said cabinet, means connecting said second coil to a source of electrical energy on said cabinet to energize said coil and produce a magnetic circuit linking said first and second coils.

12. Apparatus as claimed in claim 11, in which said window comprises a multiple sheet glazing unit having spaced sheets of glass joined at their marginal edges to enclose an air space therebetween, an electrically conductive film adherent to the inner surface of at least one of said glass sheets, spaced electrodes fixed to said sheets in contact with said film, and means connecting said electrodes with said first coil.

(References on following page)

References Cited by the Examiner

UNITED STATES PATENTS

| | | | |
|---|---|---|---|
| 1,925,224 | 9/1933 | Alder | 336—117 X |
| 2,175,039 | 10/1939 | Soulary | 338—117 |
| 2,265,980 | 12/1941 | Berger | 336—117 X |
| 2,527,720 | 10/1950 | Guyer | 65—40 |
| 2,625,640 | 1/1953 | Gaiser et al. | 219—522 |
| 2,681,438 | 6/1954 | Anderson | 336—117 |
| 2,927,441 | 3/1960 | Sharpe et al. | 219—218 X |
| 3,160,736 | 12/1964 | Catterson | 338—219 |

FOREIGN PATENTS

| | | |
|---|---|---|
| 109,741 | 4/1925 | Switzerland. |
| 1,022,613 | 1/1958 | Germany. |

RICHARD M. WOOD, *Primary Examiner.*

V. Y. MAYEWSKY, *Assistant Examiner.*